United States Patent [19]
Scott

[11] Patent Number: 5,351,250
[45] Date of Patent: Sep. 27, 1994

[54] OPTICAL BEAM STEERING DEVICE

[75] Inventor: Andrew M. Scott, Worcestershire, England

[73] Assignee: The Secretary of State for Defence in Her Majesty's Government of the United Kingdom of Great Britain and Northern Ireland, London, United Kingdom

[21] Appl. No.: 768,960

[22] PCT Filed: Apr. 11, 1990

[86] PCT No.: PCT/GB90/00550
§ 371 Date: Oct. 21, 1991
§ 102(e) Date: Oct. 21, 1991

[87] PCT Pub. No.: WO90/13056
PCT Pub. Date: Nov. 1, 1990

[30] Foreign Application Priority Data

Apr. 27, 1989 [GB] United Kingdom ............... 8909711

[51] Int. Cl.$^5$ ............................................. H01S 3/30
[52] U.S. Cl. .......................................... 372/3; 372/22
[58] Field of Search ............... 372/3, 21, 22; 307/426

[56] References Cited

U.S. PATENT DOCUMENTS

| 4,493,085 | 1/1985 | Valley | 372/106 |
| 4,500,855 | 2/1985 | Feinberg | 372/21 |
| 4,633,103 | 12/1986 | Hyman et al. | 372/3 |
| 4,778,261 | 10/1988 | Boyd et al. | 372/21 |
| 4,794,344 | 12/1988 | Johnson | 372/108 |
| 4,812,682 | 3/1989 | Holmes | 359/108 |
| 4,853,528 | 8/1989 | Byren et al. | 250/201.9 |
| 4,934,779 | 6/1990 | Dunning | 359/732 |

FOREIGN PATENT DOCUMENTS 8304145 11/1983 PCT Int'l Appl. .

OTHER PUBLICATIONS

Ackerman et al.; "Improved Performance from Non-collinear Pumping in a High-Reflectivity Brillouin-Enhanced Four-wave Mixing Phase Conjugator"; *IEEE J. of Quantum Electronics*; vol. 25, No. 3; Mar. 1989; pp. 479–483.

IEEE Journal of Quantum Electronics, vol. 25, No. 3, Mar. 1989, A. M. Scott et al. "A Review of Brillouin-Enhanced Four-Wave Mixing", pp. 438–459 International Search Report.

*Primary Examiner*—Rodney B. Bovernick
*Assistant Examiner*—Robert E. Wise
*Attorney, Agent, or Firm*—Nixon & Vanderhye

[57] ABSTRACT

An optical beam steering device (10) incorporates a laser (12), three Brillouin shifters (22 to 26, 44 to 48, 54 to 58), a four wave mixing cell (40) and a low power beam steering device (62). The first shifter (22 to 26) and the mixing cell (40) contain $TiCl_4$, and the other shifters (44 to 48, 54 to 58) contain 20% $CCl_4$/80% $CS_2$. The first and third shifters (22 to 26, 54 to 58) frequency downshift the laser beam (16) by $\delta\nu_A$ and $\delta\nu_B$ respectively. Light (16') from the first shifter (22 to 26) is amplified and provides a first pump beam input to the mixing cell (40). It then passes to the second shifter (44 to 48), for frequency downshifting by $\delta\nu_B$ and returns as a second cell pump beam (16''). Light (18') from the third shifter (54 to 58) passes via the low power beam steering device (62) to the cell (40) as a weak input signal beam (18''). The cell (40) responds to the pump beams (16', 16'') and signal beam (18'') by generating a high power beam (68) which is a phase conjugate of the signal beam (18'') and retraces part of its steered path.

8 Claims, 5 Drawing Sheets

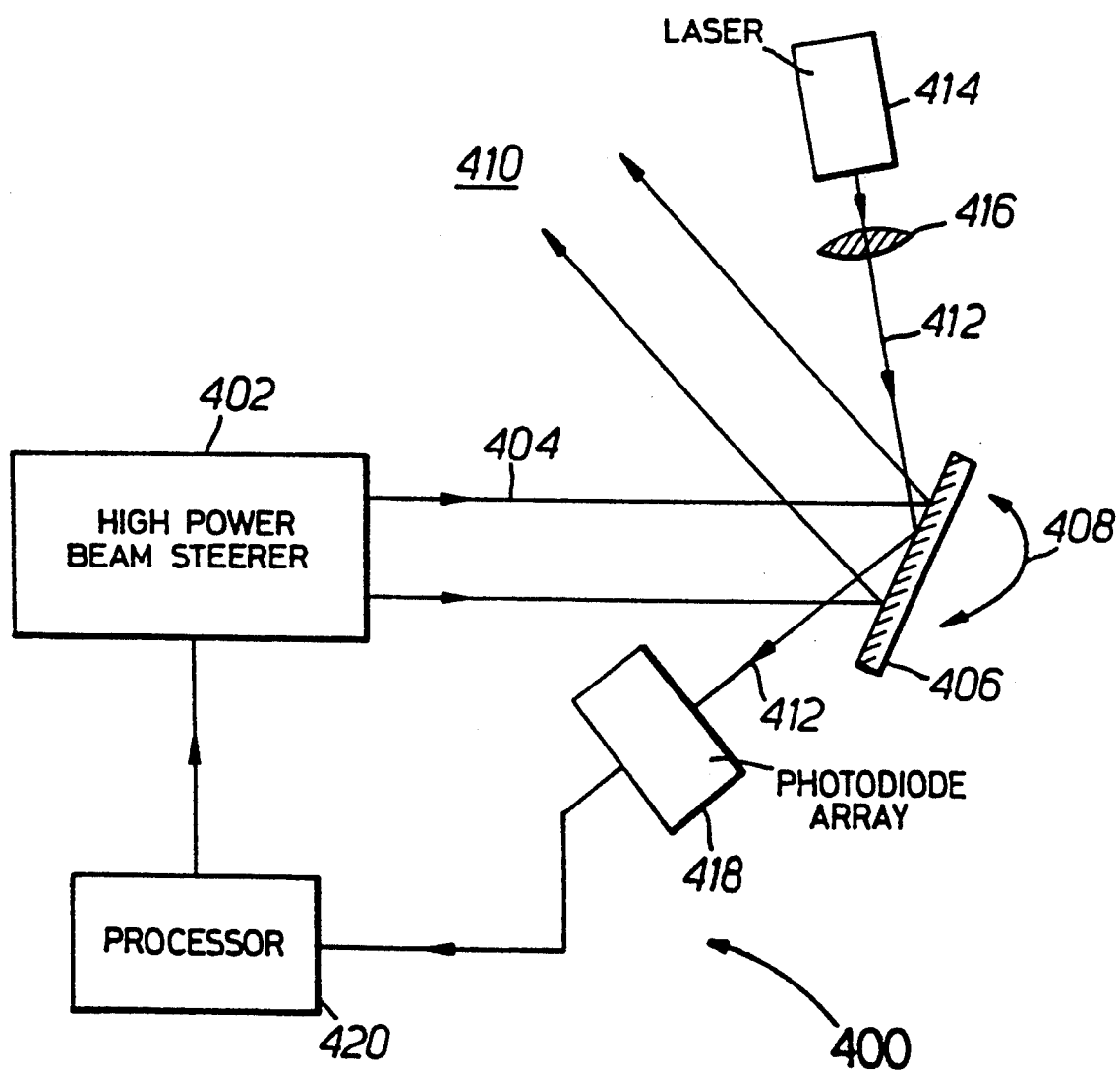

OPTICAL BEAM STEERING DEVICE

BACKGROUND OF THE INVENTION

1. Field of the Invention

This invention relates to an optical beam steering device, and in particular to a device for steering high power light beams.

2. Discussion of Prior Art

Optical beam steering devices are well-known in the prior art. Typical electro-mechanical devices involve a moving mirror employed to deflect a light beam. This suffers from the disadvantage that the energy required to rotate such a mirror is proportional to the fifth power of the mirror diameter ($D^5$). High power light beams require large diameter steering mirrors so that the power density at the mirror surface is less than a damage threshold. In consequence, high power beam steering requires a bulky and expensive moving mirror assembly.

Acousto-optical and electro-optical beam steering devices are also known in the prior art. The former comprises a piezo-electric block in which acoustic waves interact with a light beam to produce steering. The latter comprises an electro-optical waveguide array which is an optical analogue of a radar phased array. Beam steering is achieved by varying the bias voltage on (and thereby the phase change induced by) individual waveguides. However, the power handling capacity of each of these devices is severely restricted. It is orders of magnitude below that required to accommodate high power laser beams.

SUMMARY OF THE INVENTION

It is an object of the invention to provide an alternative form of beam steering device.

The present invention provides an optical beam steering device comprising means for steering a low power light beam, and phase conjugating means arranged to receive the steered low power beam and to generate a high power phase conjugate thereof.

The invention provides the advantage that high power light beam steering is produced with the aid of steering means operating on a low power beam, since the phase conjugate beam direction is governed by that of the steered beam. This makes it possible to employ conventional steering devices only suitable for low powers to control the direction of a much higher power beam. Furthermore, by virtue of the use of phase conjugating means, degradation in the optical quality of the low power beam by optical components is counteracted in the high power beam.

In a preferred embodiment, the phase conjugating means incorporates a Brillouin four wave mixing cell and pumping means for providing the cell with counter-propagating laser pump beams having frequencies appropriate to produce four wave mixing in combination with the steered low power beam. The pumping means may also incorporate a laser arranged to provide both the pump beams and the low power beam. The laser output may be divided between first and second Brillouin scattering cells arranged to provide a first pump beam and the low power beams respectively, these beams having frequencies decremented by $\delta v_A$ and $\delta v_B$ respectively from that of the laser, and a second pump beam may be provided by a third Brillouin scattering cell arranged to receive the first pump beam after transmission through the four wave mixing cell and to return it thereto with a further frequency decrement $\delta v_B$. The first pump beam may be amplified prior to input to the four wave mixing cell.

The phase conjugating means may alternatively incorporate a Brillouin amplifier and a stimulated Brillouin scattering cell.

The low power beam steering device may incorporate one of following:

(1) an acousto-optic beam steering device,
(2) a telescope arranged to receive light from a lens via a rotatable mirror, the mirror being arranged adjacent to a common focal plane of the telescope and lens, and
(3) an electrically addressable spatial light modulator having a variable reflectivity surface disposed in a focal plane of focussing means.

BRIEF DESCRIPTION OF THE DRAWINGS

In order that the invention might be more fully understood, examples thereof will now be described, by way of example only, with reference to the accompanying drawings, in which:

FIG. 7 illustrates mirror pointing error correction.

DETAILED DISCUSSION OF PREFERRED EMBODIMENTS

Figure 1:
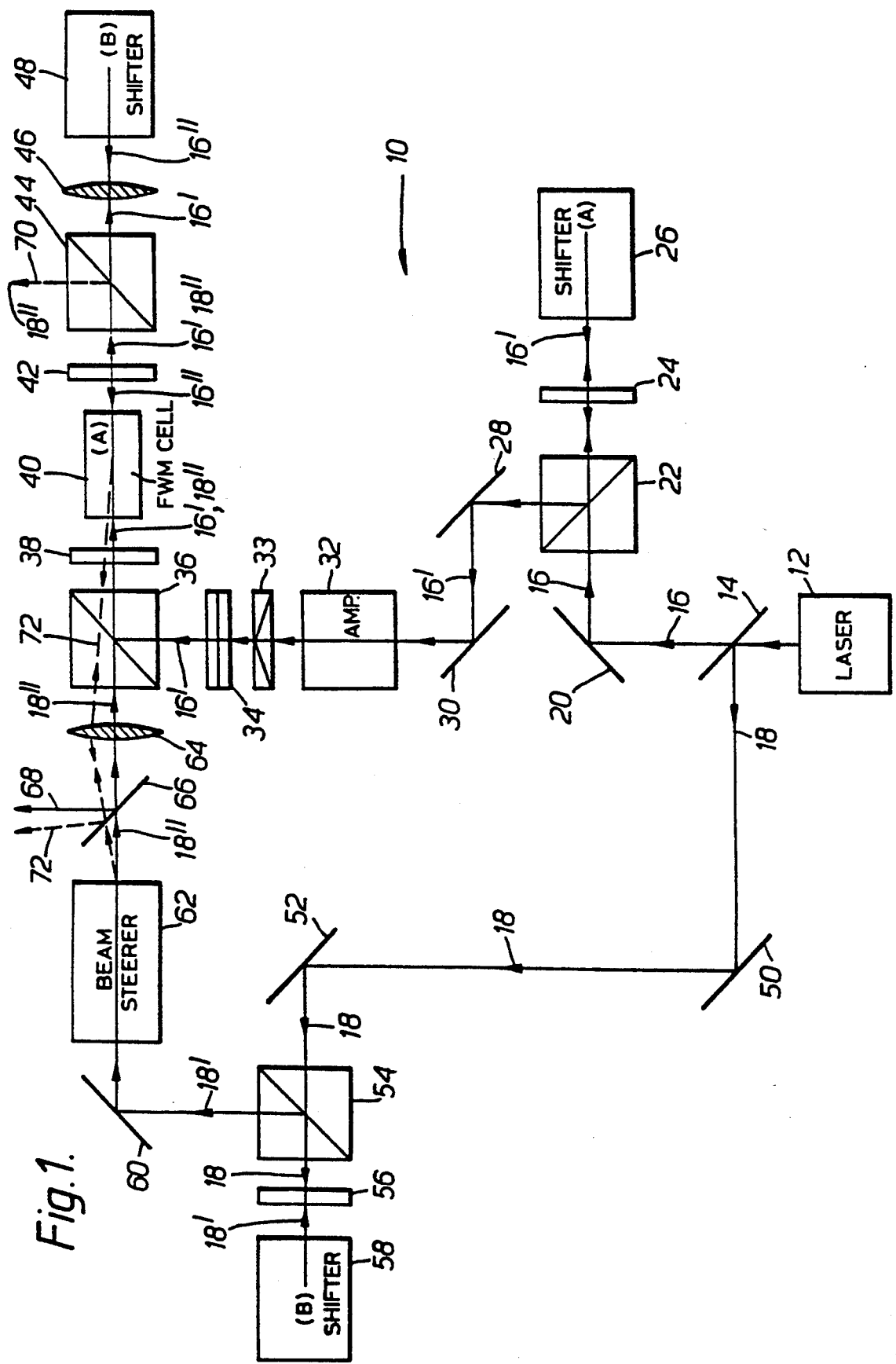
FIG. 1 is a schematic block diagram of an optical beam steering device of the invention.

Referring to FIG. 1, an optical beam steering device 10 incorporates an injection seeded Nd-YAG laser 12 providing 50 mJ, 25 nanosec output pulses with a divergence—diameter product of 1.3 mm mrad. Light from the laser 12 is vertically polarised, i.e. perpendicular to the plane of the drawing. It passes to a partially transmitting, partially reflecting first mirror 14, which provides transmitted and reflected beams 16 and 18 containing respectively 90% and 10% of the laser output intensity.

The transmitted beam 16 is reflected by a second mirror 20 to a first polariser 22 arranged to transmit vertically polarised light and reflect horizontally polarised light, the latter having polarisation in the plane of the drawing. The beam 16 passes through the polariser 22 to a first quarter wave plate 24, which converts the beam to right hand circular (RHC) polarisation. The beam is then received by a first Brillouin shifter cell 26 containing $TiCl_4$ (medium A). The cell 26 is of known kind. It incorporates a lens (not shown) to focus the beam 16 within its active medium. An example of a Brillouin shifter cell incorporating focussing means is described by M. V. Vasileve et al in Sov. Phys. JETP Lett., Vol. 31, p. 634, 1980. The cell 26 downshifts the beam frequency and backscatters it as a phase conjugate beam 16' with reversed (i.e. left hand circular, LHC) polarisation to the quarter wave plate 24, and the latter converts it to horizontal polarisation. This polarisation is reflected by the polarizer 22 via third and fourth mirrors 28 and 30 to a laser amplifier 32. The amplifier 32 provides a 300 mJ output with a diameter of 4 mm between $e^{-2}$ points. Light from the amplifier 32 is transmitted by a Faraday isolator 33, which is non-transmissive in the reverse light propagation direction. After leaving the isolator 33, the light is converted to vertical polarisation by a half wave plate 34, and then passes to a second polariser 36 arranged to reflect vertically polarised light.

Light 16' reflected by the second polariser 36 passes to a second quarter wave plate (or Fresnel rhomb) 38 for conversion to RHC polarisation, and thence to a Brillouin four wave mixing (FWM) cell 40. The cell 40 is 20 cm long and has a square cross-section of side 4 mm internally. It is fabricated of fused silica, and contains medium A. It has windows tilted at 70° to the axis of the beam 16' to avoid parasitic Brillouin oscillation. Light 16' passes from the cell 40 to a third quarter wave plate 42, where it is converted to vertical polarisation, and it is then transmitted by a third polariser 44 arranged to transmit vertically polarised light and reflect horizontally polarised light. A first lens 46 brings light transmitted by the third polariser 44 to a focus within a second Brillouin shifter cell 48. The cell 48 contains a mixture of 20% $CCl_4$/80% $CS_2$ (medium B). It downshifts the beam frequency and backscatters the light to the FWM cell 40 as a phase conjugate, vertically polarised second pump beam 16''. This beam retraces the path of beam 16'' to waveplate 34, and is rejected by the Faraday isolator 33. The beam 16' is RHC within the FWM cell 40. The elements 36 to 48 have antireflection-coated optical surfaces.

Turning now to the "weak" or low intensity vertically polarised beam 18 reflected from the first mirror 14, this passes via fifth and sixth mirrors 50 and 52 to a fourth polariser 54 arranged to transmit vertically polarised light and reflect horizontally polarised light. The beam 18 is consequently transmitted by the polariser 54 to a fourth quarter wave plate 56, which converts it to RHC, polarisation. It is then focussed within a third Brillouin shifter cell 58 containing medium B and incorporating focussing means (not shown). Here it is frequency downshifted and returned as a phase conjugate, LHC polarisation beam 18' to the quarter wave plate 56 for conversion to horizontal polarisation. On return from the plate 56, the beam 18' is reflected by the fourth polariser 54 to a seventh mirror 60. Here it is reflected to a low power beam steering element 62 to be described later in more detail, and which provides a steered beam 18''.

A second lens 64 images the output aperture (not shown) of the beam steering element 62 on to the entrance of the FWM cell 40. The steered beam 18'' passes to the lens 64 through a 90% reflecting, 10% transmitting eighth mirror 66. The output aperture of the steering element 62 is imaged by the lens 64 on to the entrance aperture of the cell 40. This ensures that, as the beam 18'' is steered, it continues to be incident on the cell 40. Having horizontal polarisation, the beam 18'' is transmitted by the second polariser 36 to the second quarter wave plate 38, where it is converted to left hand circular (LHC) polarisation. The spacing and positioning of the polarizer 36 and wave plate 38 is such that they do not suffer damage from the focus of the low power beam and its high power conjugate produced by the lens 64. This lens ensures that the steered low power beam 18'' passes into the FWM cell 40 irrespective of steering direction. The beam 18'' experiences total internal reflection at the longitudinal walls of the cell 40. As will be described later in more detail, the cell 40 returns an LHC fourth beam along the path of the beam 18'' to the 90% reflecting mirror 66, and most of the intensity in this fourth beam is consequently reflected by the mirror 66 to provide an output beam 68. The output beam 68 is the phase conjugate of the signal beam 18''.

The signal beam 18'' emerges from the FWM cell 40, and is converted back to horizontal pularisation by the third quarter wave plate 42. It is then reflected out of the device 10 as indicated by a chain line 70.

The Brillouin shifter cells 26, 48 and 58 produce frequency downshifting by stimulated Brillouin scattering. If the frequency reductions are $\delta v_A$ and $\delta v_B$ for media A and B respectively, then cell 26 reduces frequency by $\delta v_A$ and cells 48 and 58 reduce it by $\delta v_B$. If the output frequency of the laser 12 is $v_o$, then the frequencies of light in the beams 16', 16'' and 18'' are as shown in Table 1:

TABLE 1

| BEAM | FREQUENCY | BRILLOUIN SHIFTER CELL(S) |
|---|---|---|
| 16 | $v_o$ | — |
| 16' | $v_o - \delta v_A$ | 26 |
| 16'' | $v_o - \delta v_A - \delta v_B$ | 26 and 48 |
| 18'' | $v_o - \delta v_B$ | 58 |

Of the above, 16' and 16'' are high intensity, mutually counter-propagating beams which pump the FWM cell 40. The beam 18'' is the "input signal" beam, which creates interference with beam 16'' to produce a travelling acoustic wave at a difference frequency $\delta v_A$ within the FWM cell 40. This acoustic wave grows exponentially in time when the pump beams are present due to the instability known to occur in Brillouin enhanced four wave mixing. It backscatters and frequency downshifts beam 16' to produce a (fourth) beam of frequency $v_o - 2\delta v_A$ (the difference frequency) and conjugate to the signal beam 18''. The operation of the FWM cell 40 is discussed in more detail by A M Scott and K D Ridley in "A Review of Brillouin Enhanced Four Wave Mixing", IEEE Journal of Quantum Electronics, March 1989. This fourth beam becomes the output beam 68 as previously described. It retraces the path of the input signal beam 18'' to the mirror 66. The input signal beam 18'' is steerable by the steering element 62, and consequently the direction of the output beam 68 is steerable also, as indicated by chain lines 72. The output beam 68 contains between 40% and 80% of the intensity in beam 16' when the latter first reaches the FWM cell 40, and the output beam is in the order of $10^4$ times more intense than the input signal beam 18''. The invention therefore makes it possible to steer a very intense laser beam in response to steering of a weak beam by an element 62 suitable only for the latter.

Table 1 illustrates the required inputs to the FWM cell 40. These comprise a weak beam 18'' and a strong beam 16' with a relative frequency difference $\delta v_A - \delta v_B$ (typically about 400 MHz), together with a second strong beam 16''. The beams 16', 16'' and 18'' may be generated by means other than that illustrated.

Phase conjugation in the FWM cell 40 not only produces a high power output beam 72, it also corrects for optical distortions experienced by the beam 18'' as it is imaged within the cell 40 and internally reflected by the cell's walls. The low power beam 18'' will be degraded by aberrations in the lens 64; this will worsen with increasing angle of steer and consequent increase in departure from paraxial conditions. The phase conjugate beam 72 leaving the FWM cell 40 has the inverse of these aberrations, and the return of this beam through the lens 64 consequently eliminates their effect. The phase conjugation process in the cell 40 is also insensitive to multiple reflections within the cell.

Figure 2:
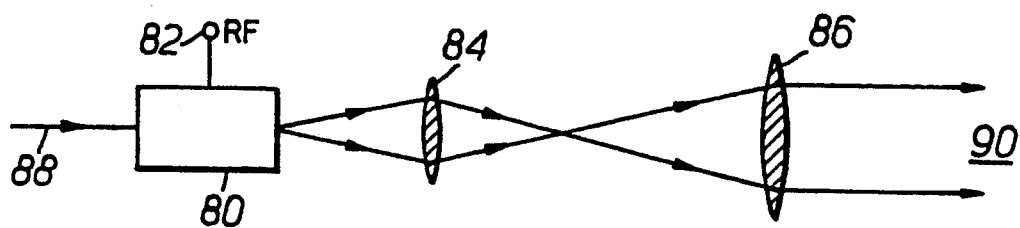
FIGS. 2, 3 and 4 schematically illustrate low power beam steering means for use in the FIG. 1 device.
Figure 3:
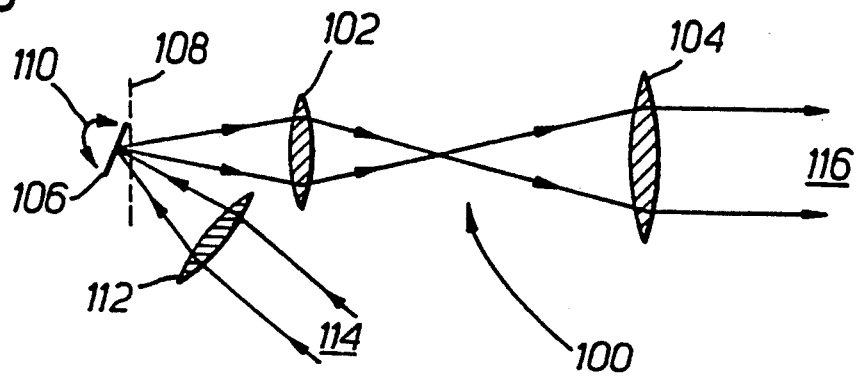
Figure 4:
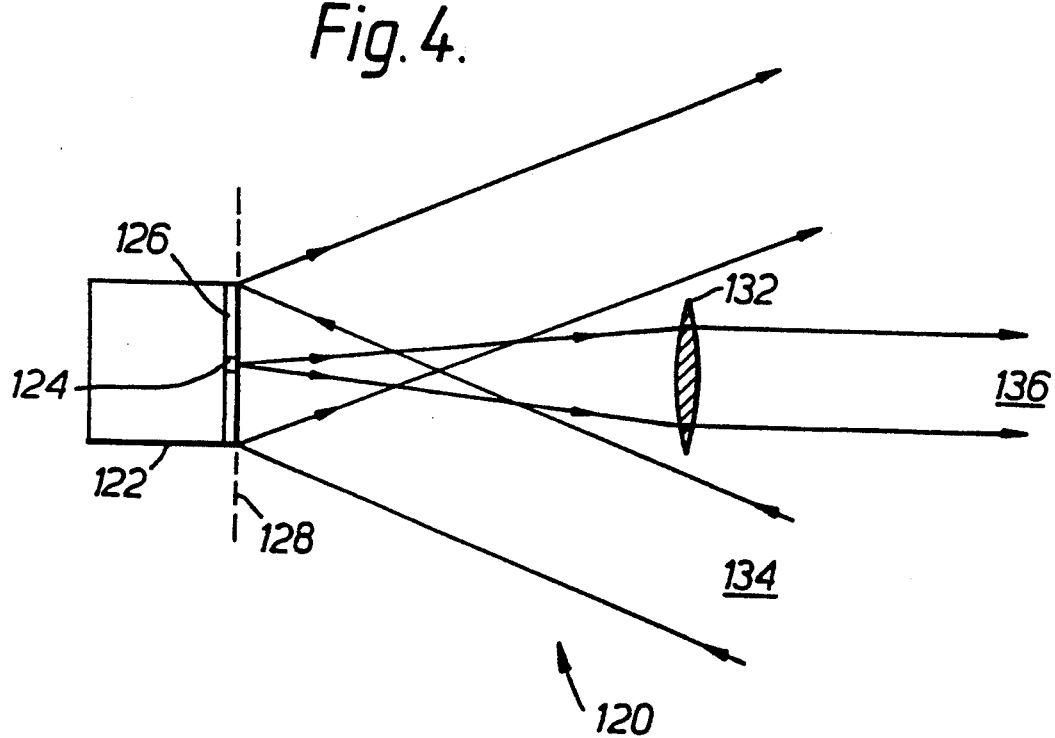

Referring now to FIGS. 2, 3 and 4, there are shown various forms of low power beam steering apparatus suitable for performing the function of the element 62 of FIG. 1. In FIG. 2, an acousto-optic modulator 80 having a radio frequency (RF) signal input 82 is optically coupled to two lenses 84 and 86 forming a telescope. An input light beam 88 passes through the modulator 80 and telescope 84/86 to produce an output beam 90. The direction of the beam 90 is steerable by variation of the frequency of the RF signal input at 82. The modulator 80 is of known and commercially available kind, and will not be described in detail. Two orthogonally disposed modulators 80 may be used to provide two-dimensional steering.

FIG. 3 shows an alternative form of low power beam steering element 100 incorporating lenses 102 and 104 forming a telescope. A small, rotatably mounted mirror 106 is located just beyond the telescope's focal plane indicated by a chain line 108. The mirror 106 is rotatable about an axis perpendicular to the plane of the drawing as indicated by arrows 110, and receives light from a third lens 112. A parallel input light beam 114 is brought to a focus at the focal plane 108 by the third lens 112 and via reflection at the mirror 106. The telescope 102/104 converts the focussed light to a parallel output beam 116. Rotation of the mirror 106 steers the direction of the output beam 116. This allows a small, lightweight mirror to be used for beam steering, but the optical power density experienced by the mirror is comparatively high.

FIG. 4 shows a further alternative beam steering element 120 incorporating an electrically programmable spatial light modulator 122. The modulator 122 is of generally known kind, and has the property that the optical state of each pixel such as 124 on its active surface 126 can be controlled by electrical addressing. The surface 126 lies in the focal plane 128 of a lens 132. The surface 126 is illuminated obliquely by parallel light 134, and the modulator 122 is controlled so that one pixel 124 is in a scattering state and all others are reflecting. In consequence, the lens 32 receives only light scattered from the pixel 124, and collimates the scattered light to produce a parallel output beam 136. The direction of the output beam 136 is determined by the position of the pixel 124 on the surface 126, and accordingly the output beam direction is steerable by change of pixel address. Unlike previously described beam steering elements, there is a discontinuous shift of output beam direction when the pixel address is changed. This form of beam steering therefore offers choice of any one of a set of discrete beam directions, as opposed to a continuous range of such directions.

Other possible forms of low power beam steering apparatus for use as the element 62 include electro-optic waveguide arrays as described in European Patent Application No EPA 0130859, British Patent No 1592050 and PCT Application No PCT/GB88/00928.

Figure 5:
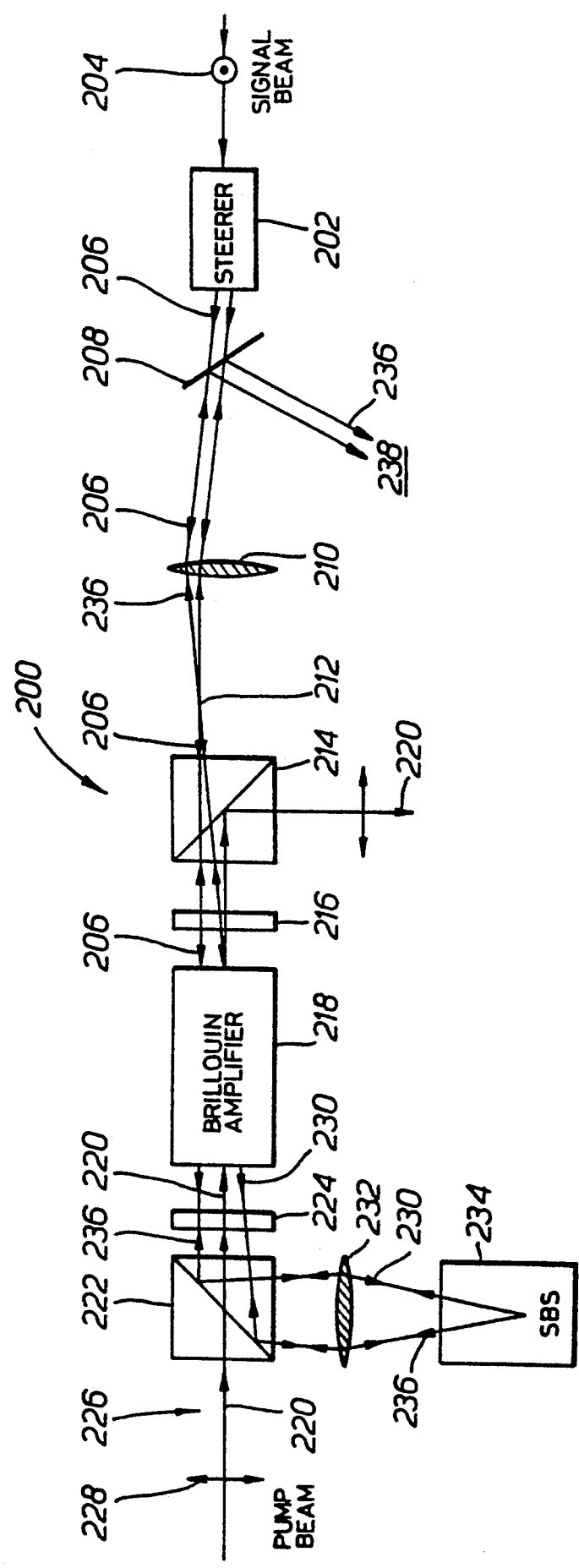
FIGS. 5 and 6 schematically show alternative embodiments of beam steering devices of the invention.

Referring now to FIG. 5, an alternative beam steering device 200 of the invention is shown schematically in plan. The device 200 incorporates a low power beam steering element 202 receiving an input signal beam 204. The beam 204 is of low power and is polarised vertically, i.e. perpendicular to the plane of the drawing as indicated conventionally by a circle with a central dot. It has a frequency of $v_1 - \delta v_A$, where $v_1$ is a pump beam frequency and $\delta v_A$ is a Brillouin frequency shift. The element 202 generates a steered output beam 206, a small percentage of which is transmitted by a high reflectivity mirror 208 to a lens 210. The lens 210 produces an intermediate focus 212, from which light diverges via a first polariser 214 and a first quarter wave plate 216 to a Brillouin amplifier cell 218. Within the cell 218, the light beam 206 in LHC polarised. The cell 218 has an entrance aperture (not shown) which is imaged by the lens 210 on to the output aperture (not shown) of the beam steering element 202.

The amplifier cell 218 contains $TiCl_4$ (medium A). It receives input of a pump beam 220 via a second polariser 222 and a second quarter wave plate 224. The pump beam has a frequency $v_1$, and, in an input region 226, is horizontally polarised (in the plane of the drawing) as indicated by arrows 228. Within the cell 218, the pump beam is LHC polarised.

An output beam 230 from the cell 218 passes via the second quarter wave plate 224 and polariser 222 to a lens 232, which focusses it within a stimulated Brillouin scattering (SBS) cell 234 containing 20% $CCl_4$/80% $CS_2$ (medium B).

The beam steering device 200 operates as follows. The pump beam 228 becomes right hand circularly (RHC) polarised by passing through the second polariser 222 and quarter wave plate 224. It then passes through the amplifier cell 218 to the first quarter wave plate 216, which converts it to horizontal polarisation. This polarisation produces rejection (reflection out of the optical system) at the first polariser 214.

The low power steered beam 206 is transmitted through the first polariser 214, and is converted from vertical polarisation to left hand circular (LHC) polarisation by the first quarter wave plate 216. It is amplified in the amplifier 218, which has a gain of $10^9$ at the relevant beam frequency $v_1 - \delta v_A$. The output beam 230 resulting from amplification has unchanged frequency and polarisation, and is converted to vertical polarisation by the second quarter wave plate 224. This polarisation is reflected by the second polariser 222 to the SBS cell 234. The cell 234 produces a backscattered beam 236 downshifted by $\delta v_B$ to a frequency $v_1 - \delta v_A - \delta v_B$ and having conjugate phase to the incident beam 230. The conjugate backscattered beam 236 retraces the path of the output beam 230 and steered beam 206 to the high reflectivity mirror 208. It passes through the amplifier 218 substantially unaffected because of its reverse direction and changed frequency compared to the beam 230. Over 90% of the intensity in the conjugate beam 236 is reflected by the mirror 208. This provides a collimated output beam at 238 which has high optical quality by virtue of phase conjugation, and which is steerable by means of the beam steering element 202. Phase conjugation provides at least partial correction for optical imperfections in the path of the steered and amplified beams.

Figure 6:
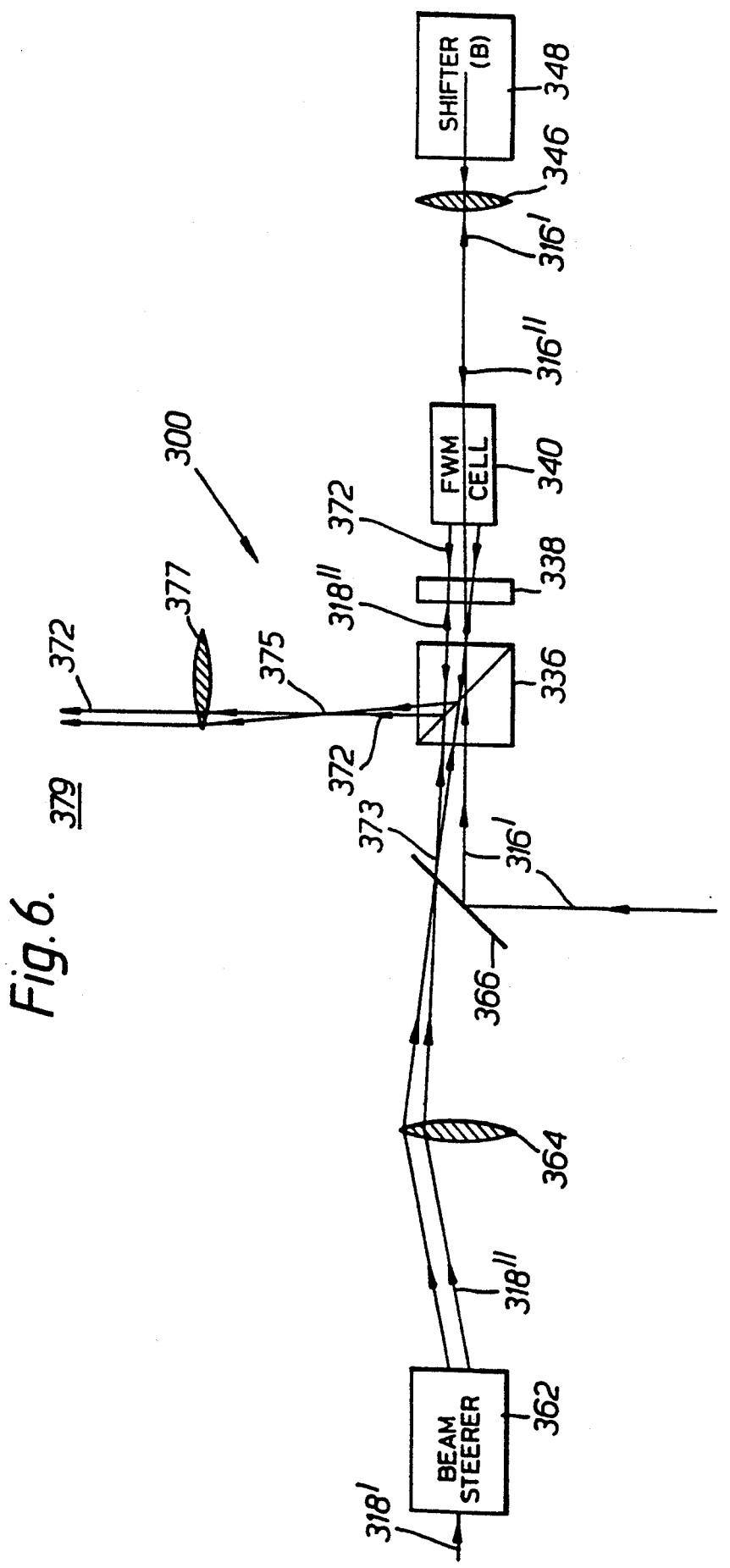

Referring now to FIG. 6, a modified version 300 of the FIG. 1 device 10 is illustrated in plan. Parts equivalent or similar to those described in FIG. 1 are like-referenced with a prefix 300. Only those parts of the beam steering device 300 in the vicinity of the FWM cell 340 are shown, other parts being as in FIG. 1. In view of its similarity to FIG. 1, the device 300 will be described in brief only.

The beam steering device 300 incorporates a beam steering element 362 receiving a low power input beam 318' and producing a steered output beam 318". A lens 364 brings the beam 318" to a focus at 373 after transmission through a high reflectivity, partially transmitting mirror 366. The beam 318" passes through a polariser 336 and a quarter wave plate 338, which convert it to circular polarisation. It then passes through an FWM cell 340 as an LHC polarised beam. A first pump beam 316' is deflected by the mirror 366 through the polariser 336 and wave plate 338, and becomes converted to left hand circular polarisation by these elements. It then passes through the FWM cell 340, and is focussed by a lens 346 into a Brillouin shifter cell 348. Here it is backscattered, conjugated and frequency downshifted to provide a second pump beam 316" for the FWM cell 340. It returns through the cell 340 as an RHC polarised beam, and is subsequently converted to linear polarisation (not shown) by the wave plate 338 and rejected by the polariser 336.

The low power steered beam 318" is divergent when it reaches the FWM cell 340 by virtue of the lens 364. It is conjugated in the cell 340 by Brillouin enhanced four wave mixing, and the resulting conjugate beam 372 is RHC polarised. The conjugate beam 372 is converted to linear polarisation by the wave plate 338 and reflected by the polariser 336. Since it is the inverse of the weak beam 318" whose path it partially retraces, the conjugate beam 372 is convergent. It converges to a focus 375 in the focal plane of a lens 377, which converts it to a parallel beam in an output region 379. The direction of the conjugate beam 372 in the region 379 is controlled by the steering element 362 redirecting the beam 318". As before, by virtue of phase conjugation the optical quality of the beam 372 is high.

A high power beam steering device of the invention of limited range of angles of steering may be employed in combination with a mechanical mirror of much wider range. The directional or pointing accuracy of the combination is improved as compared to that of the mirror alone. When a mechanical mirror is driven to point a beam in a pre-arranged direction, it will initially have a pointing error. A characteristic settling time interval will be required before the error is corrected by servo control. Moreover, the effects on a steered beam of unwanted mirror pointing error vibrations may be corrected by compensatory steering in accordance with the invention. The pointing error of the mirror may be determined electronically, and an electronic signal may then be derived to control a low power beam steering element 62 in a device 10 of the invention.

Alternatively, the pointing error of a mechanically driven mirror may be determined optically for subsequent correction with the aid of the invention. A corrected mirror pointing system 400 of this kind of illustrated schematically in FIG. 7. The system 400 incorporates a high power beam steering device 402 of the invention. The device 402 is arranged to provide a steered beam 404 incident on a mirror 406 rotable in the plane of the drawing, as indicated by arrows 408. After reflection at the mirror 406, the beam 404 passes to an output region 410. A second or reference beam 412 is also incident on the mirror 406, this beam being output from a laser 414 and collimated by a lens 418. The reference beam 412 is reflected by the mirror 406 to a photodiode array 418. The latter is connected to a processor 420, which is in turn connected to the steering device 402.

The corrected mirror pointing system 400 operates as follows. Rotation of the mirror 406 sweeps the reference beam 412 across the photodiode array 418. The instantaneous signal output from the array 418 consequently indicates the mirror inclination to the processor 420, which supplies a control signal to the steering device 402. In response, the steering device 402 adjusts the direction of the steered beam 404 to counteract inaccuracy in the inclination of the mirror 406. The inaccuracy may arise from a coarse mirror drive, or alternatively from vibration of the mirror 406. A comparatively large mirror will have a low vibrational frequency allowing time for correction as described. In consequence, it is possible to reduce the pointing time of a mechanically driven mirror, since inaccuracy in pointing and vibration about the required direction are compensated.

In FIG. 7, the reference beam 412 is incident on the same mirror surface as the high power beam 404. To avoid the possibility of high power light damaging the detector array 48, the reference beam 412 may alternatively be reflected from a prepared surface at the rear of the mirror 40.

I claim:

1. An optical steering device including:
   delivering means for providing a low power light beam;
   means for steering said low power light beam relative to said delivering means; and
   phase conjugating means, responsive to the steered low power light beam, for generating a high power phase conjugate of said low power light beam wherein the phase conjugating means includes a Brillouin four wave mixing cell and said cell comprising a means for providing Brillouin four wave mixing; and
   pumping means for providing the phase conjugating means with counterpropagating laser pump beams having frequencies for producing four wave mixing in combination with the steered low power beam.

2. An optical steering device including:
   means for steering a low power light beam; and
   phase conjugating means arranged to receive the steered low power beam and to generate a high power phase conjugate thereof, said phase conjugating means includes a Brillouin four wave mixing cell and pumping means for providing the cell with counterpropagating laser pump beams having frequencies appropriate to produce four wave mixing in combination with the steered low power beam, wherein the pumping means is also arranged to provide the steering means with a low power light beam.

3. A device according to claim 2 wherein pumping means comprises:
   (1) a laser
   (2) a first Brillouin scattering cell arranged to receive part of the laser output and reduce its frequency by a decrement $\delta\nu_A$ to provide a first pump beam input to the four wave mixing cell,
   (3) a second Brillouin scattering cell arranged to receive a further part of the laser output, to reduce its frequency by a decrement $\delta\nu_B$ and relay the frequency reduced laser output to the steering means input, and
   (4) a third Brillouin scattering cell arranged to receive the first pump beam after transmission through the four wave mixing cell, and to return it with a further frequency decrement $\delta\nu_B$ as a second pump beam.

4. A device according to claim 3 wherein an amplifier is arranged to amplify the first pump beam prior to input to the four wave mixing cell (40).

5. An optical steering device including:
(1) steering means for producing a steered low power light beam;
(2) a Brillouin four wave mixing cell, responsive to the steered low power beam, for generating a high power phase conjugate thereof; and
(3) pumping means for providing said mixing cell with counterpropagating pump beams having frequencies, said pump beams frequencies comprising a means for producing four wave mixing in combination with said steered low power beam; and
(4) said pumping means including means for providing the steering means with a low power light beam.

6. A device according to claim 5, wherein said pumping means comprises:
(1) a laser having an output frequency;
(2) a first Brillouin scattering cell, responsive to at least a portion of said laser output, for reducing said output frequency by a decrement $\delta v_A$, and for providing a first pump beam input to said four wave mixing cell;
(3) a second Brillouin scattering cell, responsive to at least a portion of said laser output, for reducing said output frequency by a decrement $\delta v_B$ and for relaying said decrement $\delta v_B$ frequency reduced laser output to the steering means input; and
(4) a third Brillouin scattering cell, responsive to said first pump beam after transmission through the said four wave mixing cell, for returning said first pump beam with a further frequency decrement $\delta v_B$ as a second pump beam.

7. A device according to claim 6, further including an amplifier comprising means for amplifying said first pump beam prior to input to said four wave mixing cell.

8. An optical steering device comprising:
(1) means for producing a steered low power light beam; and
(2) phase conjugating means, responsive to the steered low power beam, for generating a high power phase conjugate of said low power beam, said phase conjugating means including a Brillouin four wave mixing cell and pumping means for providing said mixing cell with counterpropagating pump beams, said pump beams frequencies comprising a means for producing four wave mixing in combination with said steered low power beam.

* * * * *